Figure 1A:
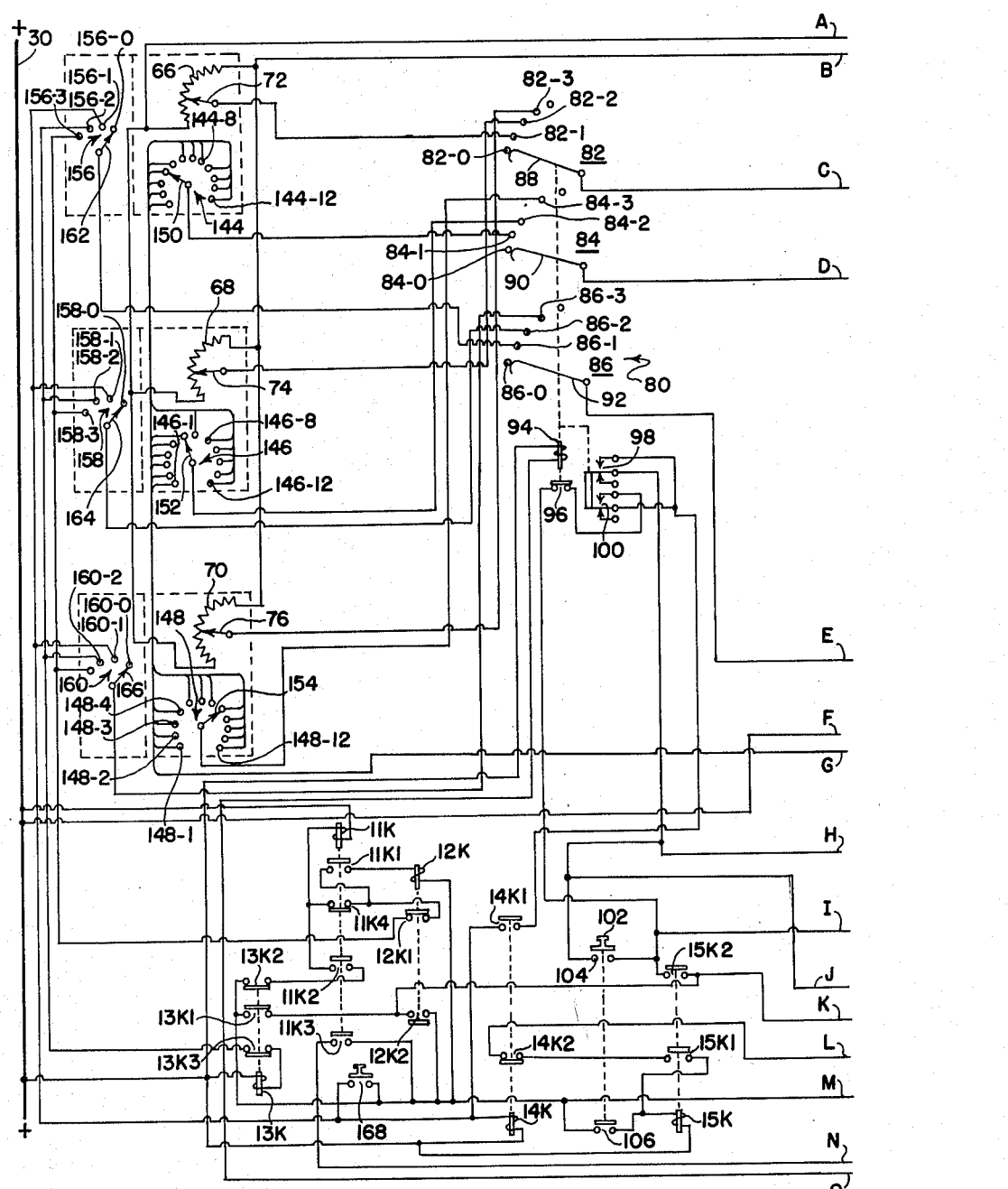

INVENTOR.
GLENN R. ROSE
BY
Stuart R. Peterson
ATTORNEY

INVENTOR.
GLENN R. ROSE
BY
Stuart R. Peterson
ATTORNEY

United States Patent Office 3,128,420
Patented Apr. 7, 1964

3,128,420
COARSE AND FINE ELECTRIC SERVOMOTOR
POSITION SELECTOR
Glenn R. Rose, St. Paul, Minn., assignor to General
Mills, Inc., a corporation of Delaware
Filed Apr. 24, 1961, Ser. No. 105,011
18 Claims. (Cl. 318—28)

This invention relates generally to manipulating or material handling apparatus, and pertains more particularly to a programmed manipulator capable of repeating various motions that have previously been "memorized."

One important object of the invention is to provide a programmed manipulator or transfer machine in which the initial programming can be accomplished with considerable ease and speed.

Another object of the invention is to provide a manipulator of the foregoing character in which the program can be readily changed from time to time as circumstances dictate.

Another object of the invention is to provide a manipulator that is comparatively simple and not apt to get out of order easily. In this regard, it is an aim of the invention to use components that are of standard construction and readily available on the market, should replacement of such components ultimately become desirable or necessary.

Another object of the invention is to provide a programmed manipulator that is quite versatile. More specifically, it is an aim of the invention to provide sufficient equipment to carry out a given set of instructions, yet which manipulator can be added to very easily when more motions are needed.

Still another object of the invention is to provide a programmed manipulator in which it is possible to have several motions occur simultaneously, thereby accelerating the reaching of a given point in space. Stated somewhat differently, it is within the purview of the invention to provide apparatus that can be manipulated in three dimensions, certain of the movements taking place concurrently so that the desired point in space will be reached in a minimum amount of time.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 1B:
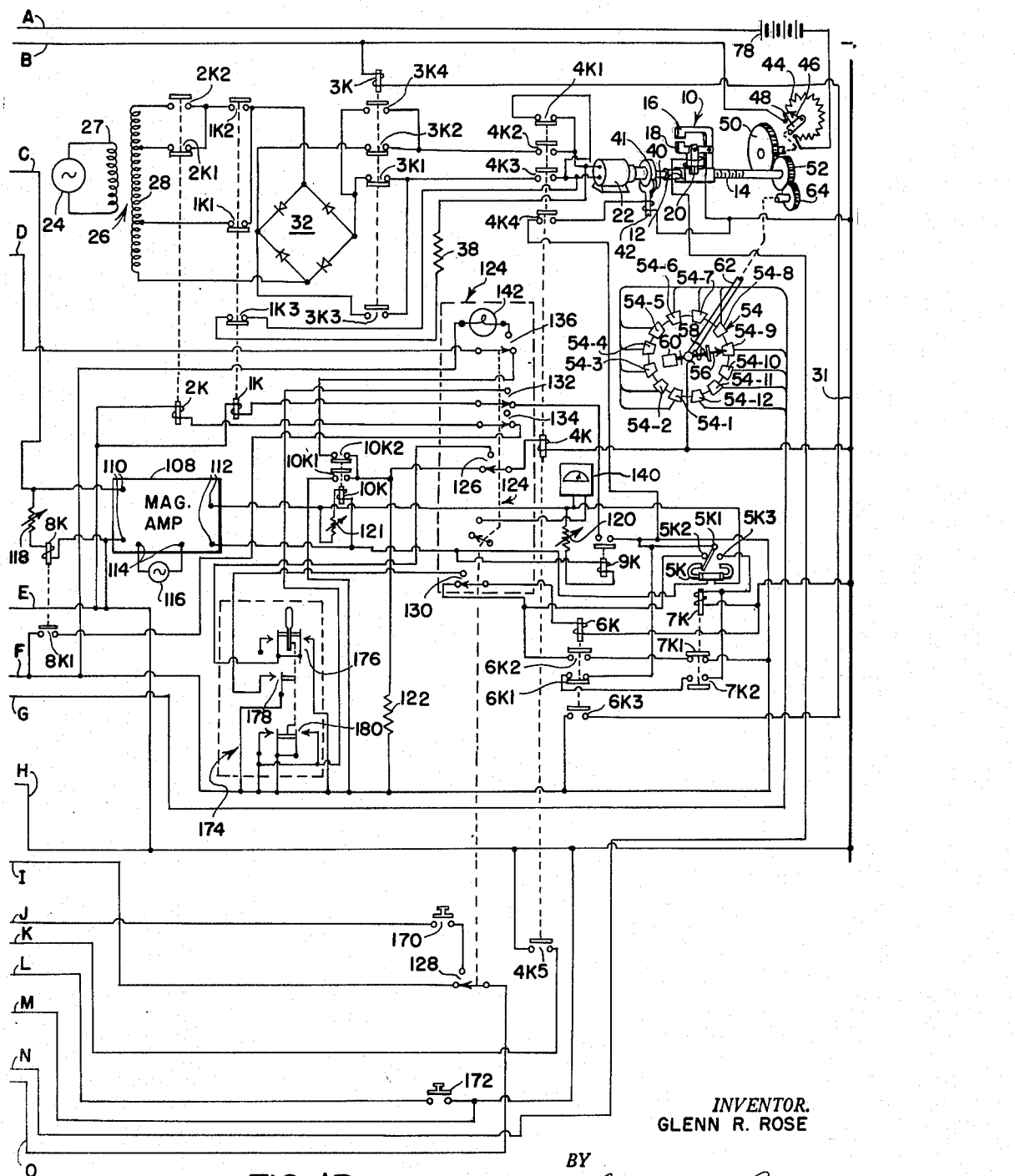

In the drawing:

FIGURES 1A and 1B together represent a schematic diagram illustrating one form the invention may assume, it only being necessary to place the two sheets of drawings in a side by side relationship to produce the composite drawing.

For the sake of simplicity and brevity, a simple transfer machine has been illustrated. Quite briefly, it is contemplated that the transfer machine or manipulator be moved through the various desired points. Coupled to the motor that powers the transfer machine is a coarse sensing potentiometer in circuit with a manually adjustable potentiometer. When a desired point is reached, the manually adustable potentiometer is moved so that it is in substantial balance with the motor actuated potentiometer. This provides only a coarse setting. The fine setting is accomplished via a vernier switch that is also driven in a given relationship from the transfer machine actuating motor. Through the medium of a selector switch having the same number of contacts as the vernier switch, a final or more exact positioning of the transfer machine for this particular point is realized. The procedure is repeated for subsequent points that are to be memorized.

It has already been stated that a relatively simple transfer machine or manipulator will be described. While not limited to any particular type of manipulating or material handling equipment, it should be mentioned at this time that one specific type that can be employed is the remote control handling unit depicted in James Patent 2,861,700 granted November 25, 1958. Sufficient duplicated circuitry would be utilized for each of the driving motors there illustrated. The application of the invention to the James handling unit will be better understood after a detailed presentation has been given.

Referring now in detail to the various figures constituting the single drawing in the case, it will be observed that a grasping hand assembly denoted generally by the reference numeral 10 has been rather arbitrarily selected to exemplify the invention. This hand assembly 10 is mounted on a travel block 12 that is moved longitudinally back and forth by a threaded shaft 14. The hand assembly comprises a fixed jaw member 16 and a pivotal jaw member 18. For the purpose of closing the pivotal jaw member 18 against the fixed jaw member 16 is an actuating solenoid 20. The manipulator or transfer machine thus far described is capable of moving an element from one point to another in either a back or forth direction. The motor for driving the shaft 22 to position the hand assembly at various longitudinal points has been given the reference numeral 22.

Although the motor 22 is a D.-C. motor, it is planned that an A.-C. source be employed, this source being indicated by the numeral 24. Connected to the A.-C. source 24 is a transformer 26 having a primary winding 27 and a tapped secondary winding 28. Between the transformer 26 and the D.-C. motor 22 is a full wave rectifier 32 to which is fed one of three A.-C. voltages derived from the tapped winding 28 by means of relay switching.

One tap changing relay has been denoted by the reference character 1K having normally closed contacts 1K1, normally open contacts 1K2, and normally closed contacts 1K3. The relay 1K, as are other relays yet to be referred to, is energized from a pair of D.-C. buses, the positive bus bearing the reference numeral 30 and the negative bus the numeral 31. The system utilized in designating the various relays will involve the use of a numerical prefix indicating the particular relay and a series of numerical suffixes indicating the contacts actuated by that particular relay. While more will be said hereinafter concerning the tap changing function of the relay 1K, nonetheless at this time it will be mentioned that the contacts 1K3 are in circuit with a resistor 38, the resistor 38 and these particular contacts being connectable directly across the motor 22 so as to accomplish a dynamic braking effect whenever the relay 1K is de-energized. Another tap changing relay is relay 2K having normally closed contacts 2K1 and normally open contacts 2K2. It is realized that insufficient information has been given up to this point for a full appreciation of how the relays 1K and 2K function, but it is believed that the roles played by these two relays will be better understood as the description progresses, especially after their supervisory relays are referred to inasmuch as relays 1K and 2K are merely slaves of their associated supervisory relays.

A motor reversing relay 3K is also employed. It will be noted that the relay 3K controls normally closed contacts 3K1, 3K2, and normally open contacts 3K3, 3K4. All that the reversing relay 3K does is to reverse the rotation of the D.-C. motor 22 through the simple expedient of interchanging the armature lead connections.

Performing a very important function in the instant circuitry is a start and stop relay 4K having normally closed contacts 4K1 and normally open contacts 4K2, 4K3, 4K4, and 4K5. Here again, the role played by this particular relay is better reserved for discussion at a later time. However, it will be discerned that the normally open contacts 4K4 exercise control over the brake shoe 40 that is spring-urged against a brake drum 41 carried on the shaft 14. The specific control is derived through the agency of a solenoid 42 which retracts the brake shoe 40 from its drum 41 whenever the relay 4K is energized.

Mechanically coupled to the shaft 14 is a ten turn potentiometer 44 whose 3600 degrees of travel is selected to correspond to the full-scale travel of the block 12 on which the hand assembly 10 is mounted. At this time it is to be understood that the potentiometer 44 is used as a coarse position indicator and includes a wiper arm 46 rotatably carried on a wiper arm shaft 48. The shaft 48 is driven by a reduction or step down gear 50 enmeshed with a drive gear 52 on the shaft 14. As already stated, ten turns of the potentiometer 44 represent full travel of the block 12.

Inasmuch as the potentiometer 44 is only intended to give a coarse or an approximate positioning of the hand assembly 10, provision is made for a fine or vernier positioning of the hand assembly 10. Instrumental in achieving this particular aim is a vernier switch 54 equipped with 12 stationary contacts 54–1 through 54–12. The vernier switch 54 includes a wiper arm 56 that is mounted so that a coil spring 58 normally urges the arm into engagement with the various contacts 54–1 through 54–12 depending upon the particular rotational position of said arm. Because the arm 56 is to rotate at an appreciable rate of speed, it is highly desirable that the above-alluded to contact engagement not occur until approximately the time during which the actual engagement is needed. To achieve this end, a weight member 60 is carried at one end of the arm 56 so that when a sufficient centrifugal force is developed by the rotation of the arm 56 said arm is automatically moved away from or out of engagement with the various contacts of the switch 54. The arm 56 is driven via a shaft 62 and a gear 64 in mesh with the previously mentioned gear 52 on the shaft 14. As an example, one complete rotation of the shaft 14 moves the travel block 12 through a distance 0.2 inch, each contact on the vernier switch 54 corresponding to a movement of approximately 0.017 inch. Owing to the mechanical relationship that has been selected between the potentiometer 44 and the vernier switch 54, 36 inches when employed as the full travel of the block 12 will be represented by ten turns of the potentiometer 44. Simple arithmetic shows that one turn of the vernier switch 54 thereby represents 20 degrees of potentiometer movement. Consequently, as previously indicated, the vernier switch 54 does indeed provide a fine scale position means.

Electrically associated with the potentiometer 44 is a plurality of programming potentiometers 66, 68, and 70. One such potentiometer will be utilized for each point to be programmed. Inasmuch as we have somewhat arbitrarily selected three potentiometers 66, 68, 70 we are thus limiting ourselves to only three programmed points. This helps tremendously in minimizing the complexity of the drawings, and it is believed readily understandable that other additional points can be achieved by merely adding to the number of programming potentiometers. The potentiometer 66 includes a manually adjustable selector arm 72, the potentiometer 68 a similar selector arm 74, and the potentiometer 70 likewise a selector arm 76.

The potentiometers 66, 68, and 70 are all energized from the same source which is shown as a battery 78. Likewise, the motor driven potentiometer 44 is energized from this same source. As will presently be made clear, each of the potentiometers 66, 68 and 70 is successively connected to the potentiometer 44 to form what might be referred to as a bridge circuit.

The manner in which the above-alluded to successive connecting of the potentiometers 66, 68 and 70 to the potentiometer 44 occurs, as are other functions accomplished, is through the agency of a stepping switch denoted generally by the reference numeral 80. This stepping switch includes three contact levels 82, 84, 86. The contact level 82, for instance, comprises a home contact 82–0 and three additional contacts 82–1, 82–2, and 82–3. The contacts 82–1, 82–2, and 82–3 are employed so that the potentiometer 66 is first connected into a particular electrical circuit when the contact 82–1 is employed, and the potentiometers 68 and 70 are similarly connected into a circuit soon to be described when the contacts 82–2 and 82–3, respectively, are employed. The contact level 84 includes similar contacts 84–0, 84–1, 84–2, and 84–3, whereas the level 86 includes corresponding contacts 86–0, 86–1, 86–2 and 86–3. To successively bring these various contacts of the levels 82, 84 and 86 into the circuit are wiper arms 88, 90, and 92, there of course being a wiper arm for each level. Stepping switches of the type employed in this instance are now regarded as conventional and need not be described in detail other than to say that the energization of an operating solenoid 94 actuates or cocks a pawl which moves against a spring bias. No contact movement takes place until deenergization of the solenoid 96, whereupon advancement or stepping is occasioned by the actuating spring. For the purpose of breaking the circuit to the solenoid 94 and thereby deenergizing same there is a set of interrupting contacts 96. Also included as part of the stepping switch structure are off-normal contacts 98, 100. Off-normal contacts or springs on a switch of the envisaged type are arranged to operate when the arms 88, 90, 92 are away from their home contacts 82–0, 84–0, and 86–0. This is accomplished by a lobe which merely moves away from the springs when the arms 88, 90, 92 are rotated away from their home positions, the contacts or springs 98, 100 being permitted to close due to their own resiliency.

In order to energize the solenoid 94, a push button denoted by the numeral 102 is employed. This push button actuates a first set of contacts 104, these contacts doing the actual energizing of the solenoid, and also a second set of contacts 106, these latter contacts being in circuit with a relay that will be described hereinafter.

It has already been stated that the programming potentiometers 66, 68, and 70 are brought into an operative relation in a successive fashion. It has also been mentioned that these potentiometers are in effect balanced against the motor-driven potentiometer 44. For the purpose of detecting the degree of unbalance between the motor driven potentiometer 44 and the various programming potentiometers is a polarity sensitive magnetic amplifier labelled 108. This amplifier has input terminals 110 and output terminals 112. The amplifier is energized via a pair of terminals 114 from an A.-C. energizing source 116. It will later be better understood that each of the programming potentiometers 66, 68 and 70 is initially set so that there is no output from the magnetic amplifier 108 for the particular position of the wiper arm 46 of the potentiometer 44. Stated somewhat differently, the selector arms 72, 74 and 76 of each of the programming potentiometers are moved into a position in which a substantial zero output is effected from the magnetic amplifier 108.

Attention is now called to the presence of a direction relay 5K connected across the output terminals 112 of the magnetic amplifier 108. This relay is a conventional polarized relay having a common contact 5K1 and additional contacts 5K2 and 5K3 which are brought into circuit depending upon which way the armature of the relay is moved. The direction in which the armature is moved will depend upon the polarity of the unbalanced voltage signal of the amplifier 108. Should the unbalanced voltage indicate a forward motion to bring about a balance, the armature of the relay 5K will move in a direction to cause this to occur. On the other hand, if a reverse direction is required, then the armature will move so as to cause a bridging of contacts 5K1 and 5K3, bridging of the contacts 5K1, 5K2 causing a forward movement.

The relay for causing the above-mentioned forward movement has been denoted by 6K. This relay has normally closed contacts 6K1 and normally open contacts 6K2 and 6K3, the contacts 6K3 being in circuit with the previously mentioned motor reversing relay 3K. Once the relay 6K has picked up its contacts 6K2 are responsible for holding or locking in this relay. In this regard, it will be observed that a reverse relay 7K is also employed, this relay having normally closed contacts 7K1 which are in circuit with the previously mentioned contacts 6K2. The reverse relay 7K also has a set of normally open contacts 7K2 that are in circuit with the normally closed contacts 6K1 of the relay 6K. From what has been said, it is readily apparent that when the contacts 6K3 have been closed due to the energization of relay 6K, the motor reversing relay 3K will be energized to cause its normally open contacts 3K3, 3K4 to close and thereby cause the motor 22 to rotate in the proper direction. On the other hand, if the relay 5K should be operated by a reverse polarity unbalanced, then the closure of the contacts 5K1, 5K3 will be instrumental in dropping out relay 6K and instead operaing relay 7K, operation of relay 7K assuring that the normally closed contacts 3K1, 3K2 will apply a polarity to cause the motor 22 to rotate in a reverse direction.

Mention has already been made of the tapped secondary 28 of the transformer 26. Having mentioned the existence of the tapped secondary 28, it can now be explained that a relay 8K is connected across the input terminals 110 of the magnetic amplifier 108 through an adjustable resistor 118. This relay has a pair of normally open contacts 8K1 in series with relay 2K. The relay 8K operates on a very large error signal or unbalance between the particular programming potentiometer 66, 68, or 70 that is currently in circuit with the motor driven potentiometer 44. Thus, relay 2K is energized by closure of the contacts 2K2 to apply the maximum voltage to the rectifier 32. While the relay 8K is designed to operate on a very large unbalance, a relay 9K is incorporated into the output circuitry of the magnetic amplifier 108, this relay operating on a moderately large error signal to give a second or intermediate speed. To accomplish this aim, the relay 9K is equipped with normally open contacts 9K1 in series with the previously mentioned relay 1K. Because the relay 9K operates on a moderately large error signal, it follows that it picks up at the same time that relay 8K picks up. Hence, relay 1K is energized through the contacts 9K1 to close contacts 1K2 at the outset. Therefore, even when the motor 22 is operating at its high or maximum speed, a circuit is completed through contacts 1K2. When neither relay 8K nor 9K is energized, then only a creep speed of the motor is possible, the circuit path being through the normally closed contacts 1K1 of relay 1K. As with the relay 8K, and adjustable resistor is connected in series therewith, the resistor in this instance being denoted by the reference numeral 120.

Still another relay is connected across the output terminals 112 of the amplifier 108. This relay has been indicated by the character 10K and is in circuit with an adjustable resistor 121. This relay remains energized or picked up until the potentiometer 44 is within one turn of the vernier switch 54. The relay 10K controls normally open contacts 10K1 and normally closed contacts 10K2. The release of the relay 10K with a concomitant operation of the contacts 10K1 and 10K2 is readily effected by adjusting the resistor 121 to such a value that the release occurs within one turn of the vernier switch 54.

A dropping resistor 122 is in circuit with the start and stop relay 4K. The resistor 122 has sufficient resistance so that it does not allow the relay 4K to become energized via this route. However, it will be noted that closure of the contacts 10K1 accomplishes a ready energization of the relay 4K because there is no resistance placed in series with this relay when these particular contacts are engaged. Thus, when the relay 10K becomes energized to close its normally opened contacts 10K1, then the relay 4K picks up. Because the contacts 4K2, 4K3 are closed when the relay 4K is energized, it follows that an electrical path is completed to the motor 22 under this set of conditions. The result is that the motor 22 operates to move the hand assembly 10.

It will be recognized that the contacts 10K2 of the relay 10K are in circuit with the contact level 84 of the stepping switch 80. More will be said herinafter concerning what happens when an electrical path is established through the contacts 10K2 and the contact level 84 of the stepping switch 80.

At this time reference will be made to an automatic-manual switch 124, the purpose of this switch being, as its name indicates, to cause either automatic operation or manual operation. In order to accomplish the automatic or manual operation, the switch 124 is provided with various sections. For instance, the section 126 is provided and this section is in circuit with the start and stop relay 4K. Another section 128 of the switch 124 is in circuit with the solenoid 94 of the stepping switch 80. A further section 130 is in circuit with the forward relay 6K. Still another section 132 is in circiut with the dynamic braking and tap changing relay 1K. Another section 134 is in circuit with the tap changing relay 2K. Another section 136 of the switch 124 is in circuit with the contact level 84 of the stepping switch 80. Yet another section 138 of the switch 124 is in circuit with a meter 140 for visually noting the balance or unbalance of the magnetic amplifier 108.

To indicate when there is contact correspondence between the vernier switch 54 and any one of the programming switches 144, 146, 148, a signal lamp 142 is provided, this lamp becoming lighted when the manual position of the switch 124 is selected and the aforementioned contact correspondence is achieved during the initial programming of the equipment.

From the information that has been given it can be appreciated that the potentiometer 44 is directly related with the various programming potentiometers 66, 68, and 70. With respect to the vernier switch 54, it is to be observed that several programming switches 144, 146 and 148 are associated with this switch. Because of the association with the vernier switch 54, each programming switch 144, 146 and 148 is provided with a corresponding number of contacts. It will be recalled that the switch 54 utilizes twelve stationary contacts. Consequently, the programming switch 144 has twelve contacts, these contacts being designated as 144-1 through 144-12. By the same token, programming switch 146 has contacts 146-1 through 146-12. Likewise, the programming switch 148 possesses contacts 148-1 through 148-12. It will be understood that there is a direct electrical connection between these contacts and the contacts 54-1 through 54-12 of the vernier switch 54. Also included in the several programming switches 144, 146, and 148 are selector arms, there being an arm 150 for the switch 144, an arm 152 for the switch 146, and an arm 154 for the switch 148. These arms are manually positionable to selected contacts of the several switches 144, 146, and 148. It is also to be observed that each of the arms 150, 152, and 154 are electrically connected to various contacts of the contact level 84 of the stepping switch 80. More specifically, the arm 150 is connected to contact 84-1, the arm 152 to the contact 84-2, and the arm 154 to the contact 84-3. Consequently, when the contacts 10K1 of the relay 10K open, the contacts 10K2 of this particular relay 10K are closed. When this happens, the start-stop relay 4K remains energized through the dropping resistor 122, if the arm 90 has not shorted but this particular resistor 122 through one of the contacts of the programming switches 144, 146 and 148. This will be better understood when an operational sequence is presented.

Now to be described are the hand control selector switches. These switches have been designated by the reference numerals 156, 158 and 160. The switch 156 has four contacts which have been denoted as 156–0, 156–1, 156–2, and 156–3. Similarly, the switch 158 contains contacts 158–0, 158–1, 158–2 and 158–3. Also, the switch 160 utilizes contacts 160–0, 160–1, 160–2, and 160–3. These various contacts can be engaged and thus incorporated into the circuit by means of selector arms, there being a selector arm 162 for the switch 156, a selector arm 164 for the switch 158 and a selector arm 166 for the switch 160.

A hand closed relay 11K is employed for initiating the closure of the hand assembly 10. This relay 11K has normally opened contacts 11K1, 11K2, and 11K3. Also, the relay is equipped with normally closed contacts 11K4. The contacts 11K2 engage before the contacts 11K4 break.

Closure of the contacts 11K1 is instrumental in energizing a slow operate relay labelled 12K. The slow operate relay 12K possesses normally closed contacts 12K1 and normally open contacts 12K2. As will become more apparent, the contacts 12K1 when closed cause the stepping switch 80 to step. The contacts 12K1 make before the contacts 12K2 break in order to step the stepping switch 80.

For the purpose of effecting a release of the hand assembly 10 a relay 13K is utilized. This relay has normally open contacts 13K1, and normally closed contacts 13K2, 13K3. The contacts 13K1 make before the contacts 13K3 break. What the release relay 13K does is to deenergize the hand closed relay 11K via one of the contacts 156–2, 158–2 or 160–2.

A home relay 14K operates whenever the hand control switches are set on their contacts 156–1, 158–1 or 160–1. The home relay includes normally open contacts 14K1 and normally closed contacts 14K2. A homing push button switch 168 permits the relay 14K to be energized manually.

In order to step the stepping switch during the programming phase of the operation, a program step push button 170 is employed. It is merely manually depressed each time that a program point is to be memorized.

Contacts 106 were previously mentioned in conjunction with push button switch 102. At this time it can conveniently be pointed out that these contacts are in circuit with a start relay 15K having normally open contacts 15K1 and 15K2. To stop the operation at any time, one only has to depress a stop push button 172.

It will be recognized that a need exists for causing the motor 22 to operate in either direction during the period that a program is being memorized. To accomplish this, a manual drive toggle switch 174 has been incorporated into the circuit. This toggle switch 174 has a first section 176 which is in circuit with the start and stop relay 4K. It has a second section 178 in circuit with the forward relay 6K. Still further, a third section of this switch, which has been indicated by the reference numeral 180, is in circuit with the dynamic braking and tap changing relay 1K.

Having presented the foregoing information, the operation of our apparatus should be readily apparent. However, in order to provide for a full appreciation of the benefits to be derived from a programmed manipulator of the disclosed type, an operational sequence will now be given.

Assuming that one wishes to memorize certain points at which the hand assembly 10 is to be stopped, certain procedures are to be carried out. First, the homing push button 168 should be depressed which will energize the homing relay 14K to cause thereby the stepping switch 80 to seek its home position. This brings the various contact arms 88, 90, and 92 into engagement with their respective home contacts 82–0, 84–0, and 86–0, respectively.

Inasmuch as the various points at which the hand assembly 10 is to be stopped must be memorized for subsequent use, the automatic-manual switch 124 is moved into its manual position so that the motor 22 may be operated in such a manner as to position the hand assembly 10 at the particular points that are to be later used in a playback operation. What takes place when the automatic-manual switch 124 is moved to its manual position is that this switch paves the way for operation of the manual drive toggle switch 174. It will be perceived that the dynamic braking and tap changing relay 1K can be energized through the section 132 of the manual drive switch 124. Energization of the relay 1K of course closes the contacts 1K2, thereby conditioning the motor 22 for operation at its second or intermediate speed. The circuit to the motor 22 is completed through the concomitant energization of the start and stop relay 4K. It will be observed that section 126 of the automatic-manual switch 124 is thereby placed in circuit with the relay 4K so that when the section 176 of the manual drive switch 174 is closed this particular relay 4K picks up. Energization of the relay 4K of course closes the contacts 4K2, 4K3 leading to the motor 22. The desired direction of the motor 22 is achieved by moving the toggle switch 174 in either its forward or reverse direction. The section 178 of this manual drive switch 174 is in circuit with the forward relay 6K to accomplish the appropriate motor directional drive.

With the automatic-manual switch 124 in its manual position, it will be further realized that the stepping switch 80 can be stepped to its various contacts through the agency of the program step push button 170. Thus, since we will desire the contact levels 82, 84, and 86 of the stepping switch 80 to be moved to their various contacts 82–1 through 82–3, 84–1 through 84–3 and 86–1 through 86–3, the momentary depressing of the program step switch 170 will achieve this intermittent operation.

At this time, it will be assumed that the stepping switch 80 has been stepped to its first position. In other words, it is assumed that the contact arms 88, 90 and 92 are in engagement with the contacts 82–1, 84–1 and 86–1, respectively. From the preceeding paragraph, it will be recalled that such a state of events is easily obtained by depressing the program step push button 170. The depressing of the push button 170 just once will be instrumental in realizing this first contact position.

Because the wiper arm 88 of the stepping switch level 82 is currently on its contact 82–1, it will be seen that the arm 72 of the programming potentiometer 66 is connected to the input terminals 110 of the polarity sensitive magnetic amplifier 108. If the hand assembly 10 is at the desired first point, then the magnetic amplifier 108 is adjusted so that the meter 140 reads zero. If the hand assembly 10 is not at the desired first point, then quite obviously the motor 22 must be operated to bring the hand assembly 10 to such a point. It will be recalled from the early portion of this operational sequence that the manual drive toggle switch 174 permits the motor 22 to be operated until a particular location of the hand 10 is realized.

In any event, after the desired position of the hand 10 has been achieved and the magnetic amplifier 108 output reduced to zero, it will be understood that the vernier switch 54 has its wiper arm 56 in engagement with one of the contacts 54–1 through 54–12. It will be remembered that the vernier switch 54 is directly driven from the motor shaft 14. Owing to the mechanical connection between the vernier switch 54 and the shaft 14, the position of the wiper arm 56 is indicative of the particular position of the hand assembly 10.

It will now be observed that the wiper arm 90 of the stepping switch level 84 is on its contact 84–1. This particular contact is in circuit with the programming switch 144. The operator need not know what particular contact the wiper arm 56 of the vernier switch 54 is in engagement with. All that he now has to do is to manually rotate the selector 150 until it rests on one of the contacts 144–1 through 144–12 which will cause the light 142 to become lighted. This provides a visual indication of the correspondence of positions with respect to the arm 150 with the arm 56. The lamp 142 will not light on any other contact except the one corresponding to the one being engaged by the arm 56. This effects the memorizing of the fine scale point.

We are now ready to program the second point. To do this, the stepping switch 80 is progressed to its second contact position, this being by way of the program step push button 170. Also, at this time the hand assembly 10 is run by manual control to its new or second position. It will be remembered that the manual drive switch 174 permits the motor 22 to be rotated in the proper direction to position the hand assembly 10 at the various points along the shaft 14.

The same procedure is now followed in balancing the magnetic amplifier 108 and also securing an energization of the lamp 142. Hence, the coarse position is memorized through the programming potentiometer 68, and the fine point memorization is effected through the switch 146. This is so because the contact 82–2 which is currently being engaged by the arm 88 of the level 82 is in circuit with the programming potentiometer 68, whereas the contact 84–2 of the level 84 is in circuit with the programming switch 146.

For the sake of simplicity, only three programmed points have been selected. The third programmed point is realized in the same fashion as the first two points which have been described above. It will be recognized, though, that the programming potentiometer 70 has its wiper arm 76 connected to the contact 82–3 of the level 82, and that the selector arm 154 of the selector switch 148 is similarily connected to the contact 84–3 of the level 84.

Inasmuch as certain auxiliary functions are also to be programmed, attention is now directed to the third level 86 of the stepping switch 80. This level 86 is associated with the several hand control selector switches 156, 158 and 160. Assuming for the moment that we wish to have the hand assembly 10 closed at the first programmed point, the selector arm 162 of the selector 156 would be set to engage the contact 156–3. Hence, when the arm 92 of the level 86 engages the contact 86–1 then a circuit is completed through the hand close relay 11K.

If the hand assembly 10 is to be released when the second programmed point is reached, then the selector arm 164 would be positioned in engagement with the contact 158–2. This will cause energization of the hand release relay 13K when the contact 86–2 of the level 86 is reached.

If the stepping switch 80 is to be homed when the hand assembly 10 reaches its third programmed point, then the selector arm 166 would be placed in engagement with contact 160–1. This is instrumental in causing energization of relay 14K.

More will be said hereinafter concerning the functioning of the relays 11K, 13K and 14K when describing the play-back operation.

At this time, the playback that is possible with the program that has been memorized under the assumed set of conditions will be explained. First, the automatic-manual switch 124 is shifted so that it is placed in its automatic position. If the stepping switch 80 is not in its home position, the home push button 168 is depressed so as to move the stepping switch 80 to its home position. The home position, of course, is when the various wiper arms 88, 90, 92 are in engagement with contacts 82–0, 84–0 and 86–0, respectively.

To start the automatic cycling period, the automatic start button 102 is depressed to close contacts 104 and 106. This will cause the stepping switch 80 to move its arms 88, 90 and 92 to their first contact position which is when the arms are respectively on contact 82–1, 84–1 and 86–1.

We will assume for the sake of discussion that the hand assembly 10 is not at its desired first position. Hence, when the switch arm 88 is in engagement with contact 82–1 the programming potentiometer 66 is connected in circuit with the motor driven potentiometer 44. Due to the fact that the hand assembly 10 is not in its proper position, a voltage unbalance is produced and this voltage unbalance is impressed across the input terminals of the polarity sensitive magnetic amplifier 108. A very large error impressed across relay 8K will be responsible for energizing this particular relay and the relay when energized will cause its slave relay 2K to pick up so as to close contacts 2K2 and open contacts 2K1. This has the effect of impressing the full secondary voltage from the transformer 26 on the rectifier 32 with the consequence that the motor 22 will operate at its top speed.

Concurrently with the picking up of the relay 8K is the picking up or energization of relays 5K, 9K, and 10K. The relay 5K determines the direction that the motor 22 is to rotate in because this relay 5K is a polarized relay as previously mentioned. Should the unbalanced voltage from the amplifier 108 indicate a forward motion of the motor 22 to bring about a balance, the contacts 5K1, 5K2 of this relay will close to operate the forward relay 6K. Relay 6K locks in through its own set of contacts 6K2 and the normally closed contacts 7K1 belonging to the relay 7K. Energization of the relay 6K also causes its contacts 6K3 to close and thereby energize the motor reversing relay 3K which in turn closes its contacts 3K3 and 3K4 to effect the forward rotation of the motor 22.

Under these circumstances, relay 10K will also operate to close its contacts 10K1 to complete a circuit through relay 4K which has only been partially energized through the resistor 122; the resistor 122 prevents the relay 4K from picking up via this route, thereby compelling the relay 4K to pick up or become energized via the contacts 10K1. Operation of the relay 4K will close its contacts 4K2, 4K3 in the motor circuit thereby causing the motor 22 to rotate and drive the shaft 14. It has been assumed that the initial unbalance has been quite large, and that the relay 8K has picked up along with the other relays 9K and 10K. As the unbalance is reduced, the output from the terminals 112 of the amplifier 108 will drop. First, the unbalance across the input terminals 110 will be reduced sufficiently to release the relay 8K, and thereafter a further reduction in the unbalance will cause the relay 9K to release. Thus, there is a reduction in the motor speed caused by the release of the relay 8K followed by a second reduction due to the deenergization of the relay 9K. The reduction in speed caused by the deenergization of the relay 9K is accelerated owing to the fact that its slave relay 1K causes a dynamic braking action to come into play due to the closing of contacts 1K3 which are in series with the dynamic braking resistor labelled 38. At this stage, the motor 22 is operating at its lowest or creep speed by reason of the reduction in the error signal across the output terminals 112 of the amplifier 108. This creep speed of the motor 22 continues until the potentiometer 44 is within one turn of the vernier switch 54. It will be recalled that the adjustable resistor 121 permits the degree of energization of the relay 10K to be such that this set of conditions is realized in practice. Consequently, when the "within one turn" relationship is achieved, the relay 10K drops out, thereby opening the contacts 10K1 that have been held closed during the period that relay 10K has been energized. At the same time, normally closed contacts 10K2 are against closed.

Opening of the contacts 10K1 does not cause the start and stop relay 4K to drop out, for an energizing path is still in effect through the dropping resistor 122. While the dropping resistor 122 lowers the voltage impressed initially across the relay 1K to a level such that the relay will not pick up, nonetheless the voltage needed to keep the relay 4K energized is substantially less than that needed to pick up the relay. Hence, the relay 4K remains energized. The way in which relay 4K is de-energized to stop the motor 22 from running, the motor running at its lowest speed, is when the wiper arm 56 of the vernier switch 54 reaches the particular contact 54-1 through 54-12 which corresponds to the particular contact 144-1 through 144-12 of the selector switch 144. It will be recalled that the selector switch 144 has its arm 150 in circuit with the contact 84-1 of the level 84. Owing to this arrangement, when the arm 56 of the switch 54 does engage the corresponding contact on which the arm 150 is resting the relay 4K is effectively shorted out. Stated somewhat differently, the relay 4K which has been kept energized through the resistor 122, has a direct connection to the negative bus 31 made which naturally causes the relay 4K to drop out. Deenergization of the relay 4K closes its contacts 4K1 directly across the armature of the motor 22 to cause the motor to come to an abrupt stop and at the same time that the contacts 4K2, 4K3 are opened.

The hand assembly therefore is brought to a stop at the first programmed point.

Opening of the contacts 4K5 will cause the stepping switch 80 to step to its next contact, which contact controls the motor 22 for the second programmed point. The action that has been described above is repeated for the second programmed point. After the hand assembly 10 has been properly positioned at its second programmed point, then the stepping switch 80 is stepped to its third contact position and the entire procedure is repeated once again to cause the hand assembly to be moved to its third programmed point. Obviously, additional programmed points could be incorporated into the system very readily, the three selected programmed points being only exemplary.

The foregoing portion of the operational sequence has dealt with the operation of the motor 22 and the positioning of the hand assembly 10 along the shaft 14. It will be recalled that it was more or less arbitrarily decided hereinbefore that the hand assembly 10 be opened when the first programmed point was reached. Because of this desideratum the selector arm 162 of the hand control selector switch 156 was positioned on its contact 156-3. Therefore, when the arm 92 of the stepping switch level 86 engaged its contact 86-1, the hand close relay 11K was energized, thereby closing its contacts 11K3 which in turn caused the solenoid 20 to be operated. Operation of the solenoid 20 causes the jaw member 18 to be moved against the fixed jaw member 16 of the hand assembly 10.

At the time that relay 11K is operated, relay 12K is also picked up due to the fact that contacts 11K1 close a circuit to relay 12K. Operation of relay 12K is instrumental in closing contacts 12K2 which in turn cause energization of the stepping switch coil 94. The stepping switch spring (not shown) is thereby loaded so as to advance the stepping switch when the circuit is thereafter broken. Relay 12K breaks its own circuit by opening its contacts 12K1, thereby releasing itself and causing the stepping switch to step to the next position. In other words, the relay 12K is responsible for assuring that the desired auxiliary command has been carried out before the stepping switch is moved to its next program point.

The hand close relay 11K remains operated until some subsequent step occurs when the release relay 13K is operated from one of the pre-set hand control switches 158 or 160. We have arbitrarily selected the switch 158 to cause the hand assembly 10 to be opened and it was for this reason that the selector arm 164 was positioned on the contact 158-2. When the relay 13K picks up, it opens its normally closed contacts 13K2 to release relay 11K which allows the hand assembly 10 to open. Relay 13K also opens its own circuit via its contacts 13K3 and by reason of opening its contacts 3K1 the stepping switch 80 is caused to step to the next command position which will be the third programmed point.

When any of the selector switches 156, 158 or 160 is set on its corresponding contact 156-1, 158-1 or 160-1, the homing relay 14K will be operated at that particular step. The homing relay 14K locks in through the off normal contacts 98, 90 of the stepping switch 80 as well as causing the stepping switch to home through its interrupter spring contact labelled 96. The operation of the homing relay 14K also interrupts the automatic cycle that has been in process, for its normally closed contacts 14K2 are opened to deenergize the relay 15K just as though the automatic stop push button 172 had been actuated. When the stepping switch 80 reaches its home position, that is when its various arms are on the contacts 82-0, 84-0 and 86-0, the relay 14K releases.

From the information that has been given, it is believed readily apparent that a number of motions may be simultaneously realized with a system of the envisaged character. As has already been stated, for the sake of simplicity, only one motor 22 has been depicted and described. Reference has already been made to the James Patent 2,861,700. It is believed obvious that a system of controlling each of the motors of the James patent could be included into a composite system. The only thing that might be specifically pointed out at this time is that additional contact levels would be needed as far as the stepping switch 80 construction is concerned. More specifically, an additional pair of contact levels would be required for each motor that is to be operated. In this regard, it will be remembered that the levels 82, 84 are responsible for controlling the motor 22. If one additional motor is employed, then a duplicate pair of such contact levels would be added to the stepping switch 80. If a third motor is to be controlled, then a third pair of such levels would be required. Likewise, it is believed obvious that while three program points have been dealt with in describing the instant invention, further program points can be effected by utilizing additional programming potentiometers and selector switches. Usually, stepping switches of the variety that is contemplated in carrying out the teachings of the instant invention would have more contacts thereon than have been shown. Once again, though, it is to be realized that the drawing would be rendered rather complicated should a complete system be depicted. It is felt that sufficient detail has been given so that a person familiar with the art could readily proceed with an elaboration of the basic system.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A programmed manipulator for effecting predetermined work motions comprising a work performing device, a motor for moving said device toward a desired position, means operated by said motor for producing an electrical signal varying in accordance with the actual position of said device at any given moment, a normally ineffectual switch means also operated by said motor for stopping said motor when said motor has moved said device to its said desired position, means for producing a selected electrical signal in accordance with said desired position of the device, sensing means for comparing said signals to determine when said signals are approximately equal, and relay means controlled by said sensing means for rendering said switch means effectual when said signals are approximately equal, whereby said motor continues to operate until stopped by said switch means caused by said device having reached its said desired position.

2. A programmed manipulator for effecting predetermined work motions comprising a work performing device, motor means for moving said device toward a desired position, means operated by said motor means for producing a signal variable in accordance with the actual position of said device at any given moment, means for producing a fixed signal in accordance with said desired position of the device, sensing means for comparing said signals to determine when said signals are approximately equal, switch means operated by said motor means, said switch means having a plurality of contacts spaced in accordance with certain actual positions of said motor means, selector switch means having a number of contacts corresponding to said plurality of contacts, respective conductor means connecting corresponding contacts of said motor operated switch means in circuit with those of said selector means, relay means controlled by said sensing means when said signals are approximately equal for transferring control of said motor means to said motor operated switch means, and means actuated by said motor operated switch means for stopping said motor means when said motor operated switch means engages a contact corresponding to a selected contact of said selector switch means.

3. A programmed manipulator for effecting predetermined work motions comprising a work performing device, a motor for actuating said device toward a desired position, first means rotatively driven by said motor for producing a signal varying in accordance with the actual position of said device at any given moment, second means adjustable manually to produce a fixed signal representative of the desired position of said device, a rotary vernier switch having various contacts arranged so as to be representative of positions of said device, means driven by said motor for operating said vernier switch at a prescribed number of revolutions for each revolution of said first means, a selector switch having a similar number of contacts to those of said vernier switch, means for causing said motor to be operated under the control of said vernier switch when said signals have been reduced to a predetermined difference, and means in circuit with said vernier and selector switches for stopping said motor when said vernier switch has reached a position corresponding to a selected position on said selector switch.

4. A programmed manipulator for effecting predetermined work motions comprising a work performing device, an electric motor for actuating said device toward a desired position, a first potentiometer driven by said electric motor at one rate for producing a voltage signal having a magnitude variable in accordance with the actual position of said device at any given moment, a second potentiometer manually adjustable so as to produce a voltage signal having a magnitude representative of the desired position of said device, a vernier switch driven by said motor at a faster rate than the said one rate for said first potentiometer, said vernier switch having a plurality of contact positions representative of relative rotative positions of said motor and hence of said device, a selector switch having a similar number of contact positions to those of said vernier switch, a plurality of conductors connecting the corresponding contact positions of said switches with each other, sensing means responsive to the difference in magnitudes of said voltage signals for producing an output signal variable in accordance with said difference, first relay means controlled by said sensing means for energizing said electric motor until said difference between said voltage signals has been reduced to a predetermined value, and second relay means controlled by said first relay means for continuing to energize said motor until said vernier switch reaches a contact position corresponding to a selected contact position on said selector switch.

5. A programmed manipulator in accordance with claim 4 in which said first potentiometer is in the form of a substantial circle and the contact positions of said vernier switch are also arranged in the form of a substantial circle, said predetermined difference value being such that said vernier switch is within one rotation of its contact position corresponding to said selected contact position on said selector switch when said second relay means is caused to continue energizing said motor.

6. A programmed manipulator for effecting predetermined work motions comprising a work performing device, a motor for moving said device toward a desired position, means actuated by said motor for producing a voltage signal varying in magnitude in accordance with the actual position of said device at any given moment, a vernier switch mechanism having a contact arm actuated by said motor and a plurality of spaced contacts disposed for successive engagement by said arm, means for producing a fixed voltage signal in accordance with said desired position of the device, a selector switch mechanism having an adjustable contact arm and a plurality of spaced contacts corresponding in number to the contacts of said control switch mechanism which contacts are selectively engageable by said adjustable contact arm, conductors connecting corresponding contacts of both switch mechanisms together, sensing means for comparing said voltage signals to determine when a substantial null balance of said signals has occurred, relay means controlled by said sensing means for conditioning said control switch mechanism for operation only when said voltage signals have reached a substantial null balance, and circuit means for deenergizing said motor when the contact arm of said vernier switch mechanism engages the particular contact of its switch mechanism which corresponds to the particular contact of said selector switch mechanism that is then being engaged by said adjustable contact arm.

7. A programmed manipulator in accordance with claim 6 including speed responsive means for maintaining the contact arm of said vernier switch mechanism disengaged from the plurality of contacts of said control switch mechanism above a particular speed of said motor.

8. A programmed manipulator for effecting predetermined work motions comprising a work performing device, an electric motor for actuating said device toward a desired position, means for energizing said motor, a first potentiometer including a resistance element in the form of a substantial circle and a wiper arm rotatably driven by said motor at one speed for producing a voltage signal varying in accordance with the rotation of said motor and hence in accordance with the actual position of said device at any given moment, a second potentiometer manually adjustable so as to produce a voltage signal having a magnitude representation of the desired position of said device, a rotary vernier switch having a plurality of spaced contacts arranged in the form of a substantial circle and a wiper arm rotatably driven by said motor at a faster speed than the wiper arm of said first potentiometer, the ratio of speed of said wiper arms being such that the wiper arm of said vernier switch makes a prescribed number of revolutions for each revolution of the wiper arm of said first potentiometer, a selector switch having plurality of spaced contacts corresponding in number of those of said vernier switch and a wiper arm manually adjustable into engagement with a selected contact of said selector switch which is indicative of said desired position of said device, a conductor extending from each contact of said vernier switch to a corresponding contact on said selector switch, means responsive to the difference in said potentiometer signals for maintaining said motor energizing means in operation until the difference in potentiometer signals has been reduced to such an extent that the wiper arm of said vernier switch is within one rotation of the contact corresponding to said selector contact, and means controlled by said last-mentioned means for transferring control of said motor energizing means to said vernier switch when said differences in potentiometer signals has been reduced to said extent, said transfer means causing said means for energizing said motor to deenergize said motor when the wiper arm of said vernier switch has reached its contact corresponding to said selected contact of said selector switch.

9. A programmed manipulator for effecting predetermined work motions comprising a work performing device, an electric motor for actuating said device toward a desired position, a first potentiometer driven by said electric motor for producing a voltage signal having a magnitude variable in accordance with the actual position of said device at any given moment, a second potentiometer manually adjustable to produce a voltage signal having a magnitude in accordance with a desired position of said device, sensing means responsive to the difference in magnitudes of said voltage signals for producing an output signal in accordance with said difference, a vernier switch driven by said electric motor having a plurality of contacts representative of rotative positions of said motor, a selector switch having a similar number of contacts to those of said vernier switch, and means responsive to the output signal from said sensing means for stopping said motor when said output signal has been reduced to a predetermined magnitude and the contact position of said vernier switch is in correspondence with the selected contact position of said selector switch.

10. A programmed manipulator in accordance with claim 9 in which said last-mentioned means includes a first relay energized by said sensing means when said output signal is above said predetermined magnitude, said relay having normally open contacts in circuit with a potential source and by normally closed contacts in circuit with said selector switch, a second relay energizable when said first relay is energized to close its normally open contacts, said second relay having normally open contacts in circuit with said motor, and a voltage dropping resistor connected between said potential source and said second relay for maintaining said second relay energized after the normally open contacts of said first relay have operated, the normally closed contacts of said second relay shunting said resistor to deenergize said second relay when the contact position of said vernier switch is in correspondence with said selected contact position of said selector switch to thereby cause said motor to stop when said second relay has been deenergized and its normally open contacts thus opened.

11. A programmed manipulator in accordance with claim 10 in which said first potentiometer is comprised of a number of turns, and an adjustable resistor in series with said first relay for causing said first relay to release when said potentiometers reach a state of unbalance within one turn of said vernier switch.

12. A programmed manipulator in accordance with claim 10 including a third relay responsive to relatively large differences in magnitude of said voltage signals for causing said motor to operate at a faster speed during intervals when said relatively large differences exist.

13. A programmed manipulator in accordance with claim 12 in which said vernier switch includes a centrifugally actuated wiper arm disengageable from said plurality of contacts at said faster rate of motor speed.

14. A programmed manipulator for effecting predetermined work motions comprising a work performing device, an electric motor for moving said device to various desired points, a potentiometer driven by said electric motor for producing a voltage signal having a magnitude variable in accordance with the actual position of said device at any given moment, a vernier switch also driven by said motor, said vernier switch having a plurality of contact portions representative of relative rotative positions of said motor and hence said device, a plurality of manually adjustable potentiometers for producing fixed voltage signals each in accordance with one of said desired points, a plurality of manually settable selector switches, one for each of said desired points, sensing means responsive to two different input voltages for producing an output voltage signal variable in accordance with the difference between said input voltage, a stepping switch unit provided with first and second contact levels, said first contact level being successively connectible between each of said plurality of manually adjustable potentiometers and said motor driven potentiometer, and said second contact level being successively connectible between each of said manually settable selector switches and said vernier switch, and means responsive to the output voltage signal from said sensing means for switching control of said motor from said motor driven potentiometer to said vernier switch when the magnitude of said output voltage signal has been reduced to a predetermined value so that said vernier switch will cause said motor to stop at a position determined by the particular selector switch then connected thereto by said stepping switch unit.

15. A programmed manipulator in accordance with claim 14 including means controlled by said last-mentioned means for causing said stepping switch unit to be stepped to its next position after stoppage of said motor at a desired point.

16. A programmed manipulator in accordance with claim 14 including a number of auxiliary selector switches for controlling the functioning of said work performing device at said various desired points, there being one such auxiliary switch for each point, said stepping switch unit including a third contact level successively connectible to said auxiliary selector switches, and respective means for effecting specific functions of said work performing device, said stepping switch unit successively connecting said last-mentioned means into circuit operation via the particular auxiliary selector switch for a given desired point.

17. A programmed manipulator in accordance with claim 16 in which each of said auxiliary selector switches includes a home contact position for said stepping switch unit, and relay means energizable when said stepping switch unit has moved to a contact position which place a home contact position in circuit for causing said stepping switch unit to return to its home position.

18. A programmed manipulator for effecting predetermined work motions comprising a work performing device, an electric motor for moving said device to various desired points, a potentiometer driven by said electric motor at one speed for producing a voltage signal having a magnitude variable in accordance with the actual position of said device at any given moment, a vernier switch driven by said motor at a faster speed than said potentiometer, said vernier switch having a plurality of contact positions representative of relative rotation positions and hence certain positions of said device, a manually adjustable potentiometer for each desired point capable of producing a fixed voltage signal in accordance with the desired point it is intended to represent, a manually settable selector switch for each of said desired points, each selector switch being provided with the same number of contacts as on said vernier switch, a stepping switch unit provided with first and second contact levels, said first contact level being successively connectable between each of said manually adjustable potentiometers and said motor drive potentiometer, and said second contact level being successively connectable between each of said manually settable selector switches and said vernier switch, a polarity sensitive magnetic amplifier connected to said first contact level, said amplifier being responsive to the difference between the voltage signal of said motor driven potentiometer and the voltage signal of the particular manually adjustable potentiometer currently in circuit due to the position of said stepping switch unit, a first relay connected to the output side of said amplifier and energizable when said difference voltage signal is above a predetermined value, said first relay having a set of normally closed contacts in circuit with said second contact level and a set of normally open contacts in circuit with a source of potential, a second relay connected to said normally closed and said normally open contacts for being energized when said normally open contacts are closed, said second relay having normally open contacts in circuit with said electric motor for preventing operation of said motor unless said last-mentioned contacts are closed, and a voltage dropping resistor connected to said source of potential and to said second relay for maintaining said second relay in an energized state after it has been energized via the normally open contacts of said first relay, said normally closed contacts of said first relay shunting said second relay thru said second contact level when said vernier switch is in contact correspondence with a selected one of said selector switches.

References Cited in the file of this patent
UNITED STATES PATENTS

| | | |
|---|---|---|
| 2,840,771 | Kamm | June 24, 1958 |
| 3,007,097 | Shelley et al. | Oct. 31, 1961 |